United States Patent
Boyce et al.

(10) Patent No.: US 7,844,992 B2
(45) Date of Patent: Nov. 30, 2010

(54) VIDEO ON DEMAND SERVER SYSTEM AND METHOD

(75) Inventors: Jill MacDonald Boyce, Manalapan, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1244 days.

(21) Appl. No.: 10/527,125

(22) PCT Filed: Sep. 10, 2003

(86) PCT No.: PCT/US03/28275

§ 371 (c)(1),
(2), (4) Date: Mar. 8, 2005

(87) PCT Pub. No.: WO2004/025405

PCT Pub. Date: Mar. 25, 2004

(65) Prior Publication Data

US 2005/0246751 A1 Nov. 3, 2005

(51) Int. Cl.
*H04N 7/173* (2006.01)
(52) U.S. Cl. .................. 725/95; 725/93; 725/91
(58) Field of Classification Search .................. 725/91, 725/93, 95
See application file for complete search history.

(56) References Cited

U.S. PATENT DOCUMENTS

| | | | |
|---|---|---|---|
| 5,812,786 A | 9/1998 | Seazholtz et al. | |
| 5,917,822 A * | 6/1999 | Lyles et al. | 370/395.4 |
| 5,926,649 A | 7/1999 | Ma et al. | |
| 5,940,738 A * | 8/1999 | Rao | 725/103 |
| 6,014,694 A * | 1/2000 | Aharoni et al. | 709/219 |
| 6,124,878 A * | 9/2000 | Adams et al. | 725/118 |
| 6,246,695 B1 * | 6/2001 | Seazholtz et al. | 370/468 |
| 6,385,771 B1 | 5/2002 | Gordon | |

(Continued)

FOREIGN PATENT DOCUMENTS

JP 10-257415 A 9/1988

(Continued)

OTHER PUBLICATIONS

Mathias Johanson, "Implementation Issues for Scalable Real-Time Multimedia Communication Systems", Framkom Research Corp. Molndal, Sweden.

(Continued)

*Primary Examiner*—Brian T Pendleton
*Assistant Examiner*—Jonathan Lewis
(74) *Attorney, Agent, or Firm*—Robert D. Shedd; Robert B. Levy; Wan Yee Cheung

(57) ABSTRACT

A Video-on-Demand Server architecture transmits a plurality of pre-coded programs having different bit rates across a fixed bandwidth channel. For each program, a generator generates a plurality of different bit rate representations for each program. Each generator also provides control information at each of a plurality of successive time windows T for each bit rate representation. The control information provides a bit rate and a quality measure during each time window T. The control information enables a statistical multiplexer to select a bit rate representation for each program during each time window T to maximize the quality of the selected representations while not exceeding the total available channel capacity.

18 Claims, 2 Drawing Sheets

U.S. PATENT DOCUMENTS

| | | | |
|---|---|---|---|
| 6,542,546 B1 | 4/2003 | Vetro et al. | |
| 6,665,872 B1 * | 12/2003 | Krishnamurthy et al. | 725/95 |
| 6,680,972 B1 * | 1/2004 | Liljeryd et al. | 375/240 |
| 6,738,980 B2 * | 5/2004 | Lin et al. | 725/88 |
| 7,337,231 B1 * | 2/2008 | Li | 709/231 |
| 7,486,732 B1 * | 2/2009 | Ducharme et al. | 375/240.14 |
| 2002/0010938 A1 * | 1/2002 | Zhang et al. | 725/95 |
| 2002/0157103 A1 * | 10/2002 | Song et al. | 725/97 |
| 2003/0002577 A1 * | 1/2003 | Pinder | 375/240.01 |
| 2003/0046704 A1 * | 3/2003 | Laksono et al. | 725/96 |
| 2003/0169780 A1 * | 9/2003 | Kukic | 370/535 |
| 2004/0196907 A1 * | 10/2004 | Mihara et al. | 375/240.12 |

FOREIGN PATENT DOCUMENTS

| | | |
|---|---|---|
| JP | 2000-244509 | 9/2000 |
| JP | 2001-144802 | 5/2001 |
| JP | 2001-211201 A | 8/2001 |
| WO | WO 01/58096 | 8/2001 |
| WO | 0232147 A1 | 4/2002 |

OTHER PUBLICATIONS

Eugene Miloslavsky et al, "Rate Control for Layered Video Compression Using Matching Pursuits", Dept. of Electrical Engineering and Computer Sciences, University of California at Berkeley.

Gregor v. Bochmann et al, "Architectural Design of Adaptive Distributed Multimedia Systems", University of Montreal, Canada.

Search Report Dated May 13, 2004.

* cited by examiner

VIDEO ON DEMAND SERVER SYSTEM AND METHOD

This application claims the benefit, under 35 U.S.C. §365 of International Application PCT/US03/28275, filed Sep. 10, 2003, which was published in accordance with PCT Article 21(2) on Mar. 25, 2004 in English and which claims the benefit of provisional patent application No. 60/409,645, filed Sep. 10, 2002.

TECHNICAL FIELD

This invention relates to a technique for efficiently providing video on demand while maintaining bandwidth constraints of a fixed channel.

BACKGROUND ART

Present day Video-on-Demand (VoD) systems typically transmit Constant Bit Rate (CBR) video. Transmitting CBR video does not achieve the same efficiency as transmitting variable bit rate (VBR) video for equivalent long-term average bit rates. Transmitting multiple pre-recorded VBR-encoded video programs over a constant bandwidth channel has problems since the sum of the instantaneous bitrates required by each program can sometimes exceed the total available bitrate. On the other hand, broadcast applications employing real-time encoders use statistical multiplexing to exploit the instantaneous bitrate variations between multiple programs being carried on the same carrier or transponder. The encoders operate in real time to enable the system to constrain the total combined bit rate for all programs so as not to exceed the channel capacity over a given time window. Each video program has an associated complexity measure. A central controller dynamically adjusts the bit rate allocated to each video program based upon the relative complexities.

There now exist devices known as "video transraters" that operate to reduce the bit rate of video streams within a common compression standard, such as MPEG 2 for example. Present day transraters often experience difficulties when converting between constant and variable bit rates. Such transraters also can experience difficulties when trying to alter the bit rate for bit streams that have many scene changes, or a large number of I-Pictures.

Scalable video encoding, which permits dividing a video signal into a base layer and one or more enhancement layers, can also address bit rate issues. Several methods of scalable video encoding exist, including spatial, SNR, temporal, data partitioning, fine grain scalability (FGS), frequency scalability. The MPEG-2 and MPEG-4 video compression standards include several scalability methods. Using scalable encoding requires both the transmitter and receiver have the same ability to implement different coding algorithms, thus introducing additional complexity.

Thus, there exists a need for a technique for managing variable bit rate video on demand that obviates the disadvantages of the prior art.

BRIEF SUMMARY OF THE INVENTION

Briefly, in accordance with present principles, there is provided a method for transmitting a plurality of pre-coded programs having different bit rates across a fixed bandwidth channel. For each program, at least two, and preferably, a plurality of different bit rate representations are generated. Control information is provided at each of a plurality of successive time windows for each bit rate representation. The control information provides a bit rate and a quality measure during each time window. The control information enables selection during each time window of a bit rate representation for each program to maximize the quality of the selected representations while not exceeding the total available channel capacity in that time window.

DETAILED DESCRIPTION

Before proceeding to describe the technique of the present principles, the following terminology will prove helpful:

T is the time interval over which the system optimization is being contemplated

C is the total channel capacity available in time frame T

Figure 1:
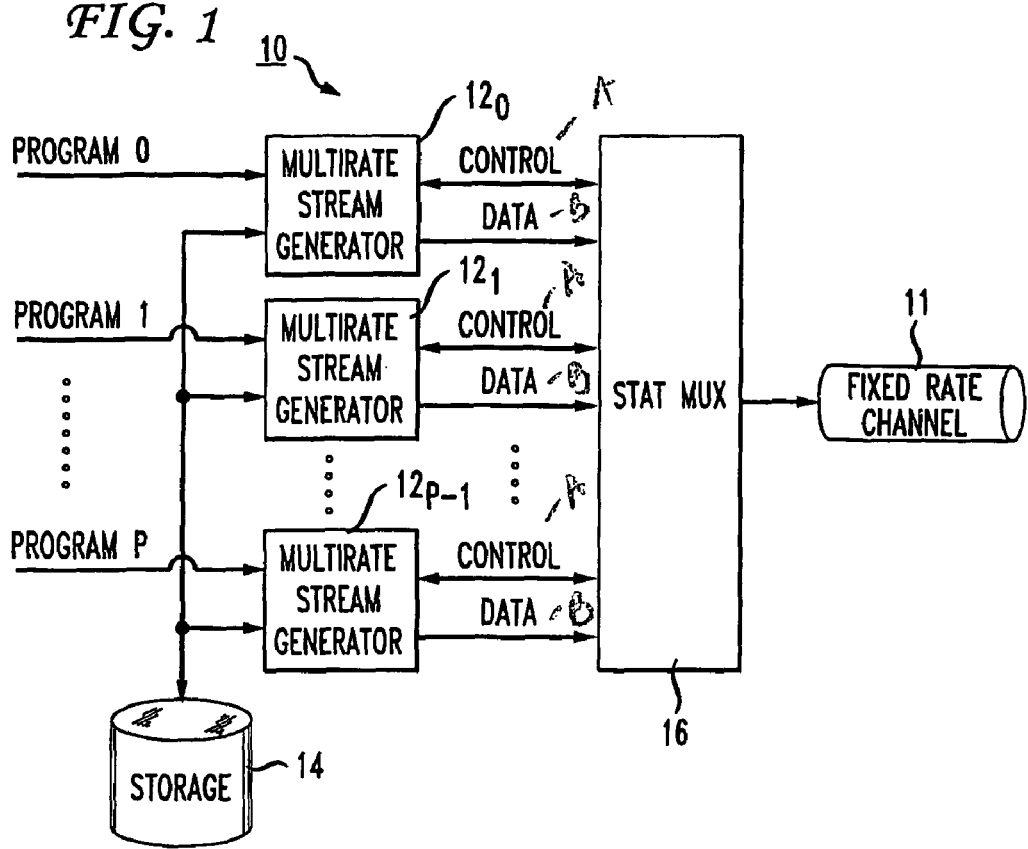
FIG. 1 depicts a block schematic of first preferred embodiment of a Video-on-Demand server architecture in accordance with the present principles.

P is the total number of programs $p \in (0, P-1)$, is the index of a particular program $N[p]$ is the total number of representations of program p $n[p] \in (0, N[p]-1)$ is the index of a particular representation of program p $r[p, x]$ is the bit rate of representation x of program p during T $q[p, x]$ is the quality of representation x of program p during T FIG. 1 depicts a first preferred embodiment of a Video-on-Demand server architecture 10 in accordance with the present principles for transmitting pre-encoded CBR and/or VBR audio/video programs over a fixed bandwidth channel 11 having a total channel capacity, C. The server architecture 10 includes a plurality of multirate stream generators $12_0$, $12_1$ ... $12_{P-1}$, where P is an integer greater than zero corresponding to the number of separate input streams. The stream rate generators $12_0$-$12_{P-1}$ each pre-code a corresponding one of the programs Program 0, Program 1 ... Program P–1 at a plurality of different bit rates. Stated another way, each multirate stream generator pre-codes the corresponding program to yield at least two or more different bit rate representations. A representation can include a particular stored encoded bit stream, or a combination of various portions of different encoded bit streams. A storage device 14, typically in the form of a single disc drive, a Redundant Array of Inexpensive Discs (RAID), or a plurality of RAIDs, serves to store the pre-coded representations generated by the multirate stream generators $12_0$-$12_{P-1}$.

Each of the multirate stream generators $12_0$-$12_{P-1}$ generates control information for each time window T of for the corresponding one of Programs 0 to P–1, respectively. The control information for each time window T for each representation of each program includes an indication of the bit rate of that representation and a quality measure, such as the peak signal-to-noise ratio (PSNR) of the representation. A central statistical multiplexer ("stat mux") 16 receives the control information for each representation. At each successive time window T, the stat mux 16 selects a representation for each program to maximize the quality of the transmitted programs while maintaining the total bit rate at or below the total capacity C of the channel 11.

The lowest bit rate representation for each program should not exceed a prescribed value such that the sum of the lowest bit rates for all programs will not exceed the channel capacity for each interval T. In this way, at least one representation of each program can undergo transmission over the channel 11. Requiring the lowest bit rate representation for each program to have a peak bit rate of C/P or less can achieve this constraint. Other methods exist that meet the constraint $$\sum_{p=0}^{P-1} r[p, 0] \leq C$$

for all time windows T of all programs. Typically, advance knowledge does not exist as to when playback of particular programs will commence. Therefore, enforcing capacity restraints becomes easiest by requiring that the bit rate limit of the lowest bit rate representation be the same for all time windows T of a particular program.

The process for the maximization of the overall combined quality can occur in several different ways. In all cases, the constraint $$\sum_{p=0}^{P-1} r[p, n[p]] \leq C$$

must remain met for all time windows T of all programs. A minimax approach can satisfy the constraint by choosing n[p] for each p∈(0, P−1) to maximize the quality of the minimum quality program (i.e., minimizing the maximum distortion.)

The minimax approach can be implemented by sorting the control information for each representation of each program so that the quality and bit rate index increases monotonically increasing with the index. The change in bit rate for each step (referred to as the "delta (Δ)" bit rate) is then stored. The stat mux 16 begins with the lowest index for each program representation and computes the total capacity S. The stat mux 16 the selects the program representation at the lowest quality and checks if adding its delta bit rate to S exceeds C. If the addition of the representation does not exceed C, the index for that representation is incremented, and process is repeated. Once C is exceeded, the representation with the next to lowest quality is checked to see if adding its delta bit rate to S exceeds C. The process is repeated until no increment in any representation can be made without exceeding the channel capacity C. Alternatively, the total quality of all programs could be optimized by maximizing the sum of the individual program qualities which involves solving the following constrained optimization problem:

$$\max_{n[\cdot]} \sum_{p=0}^{P-1} q[p, n[p]]; \text{ subject to } \sum_{p=0}^{P-1} r[p, n[p]] \leq C$$

It is also possible to optimize the product of the individual program qualities in the following manner:

$$\max_{n[\cdot]} \sum_{p=0}^{P-1} q[p, n[p]]; \text{ subject to } \sum_{p=0}^{P-1} r[p, n[p]] \leq C$$

A weighted average can also be used, in order to provide different classes of service for different viewers.

The multirate stream generators $12_0$-$12_{P-1}$ can use several different methods, or a combination of methods to form multiple representations of each program. In all cases, a random access point, such as an intra-coded (I) frame should occur at the beginning of each time window T, for each representation, so that for each time window T a different representation can be chosen without causing drift. Each representation can use either CBR or VBR coding as long as the capacity of the lowest bit rate representation meets the total channel capacity constraint.

Figure 2:
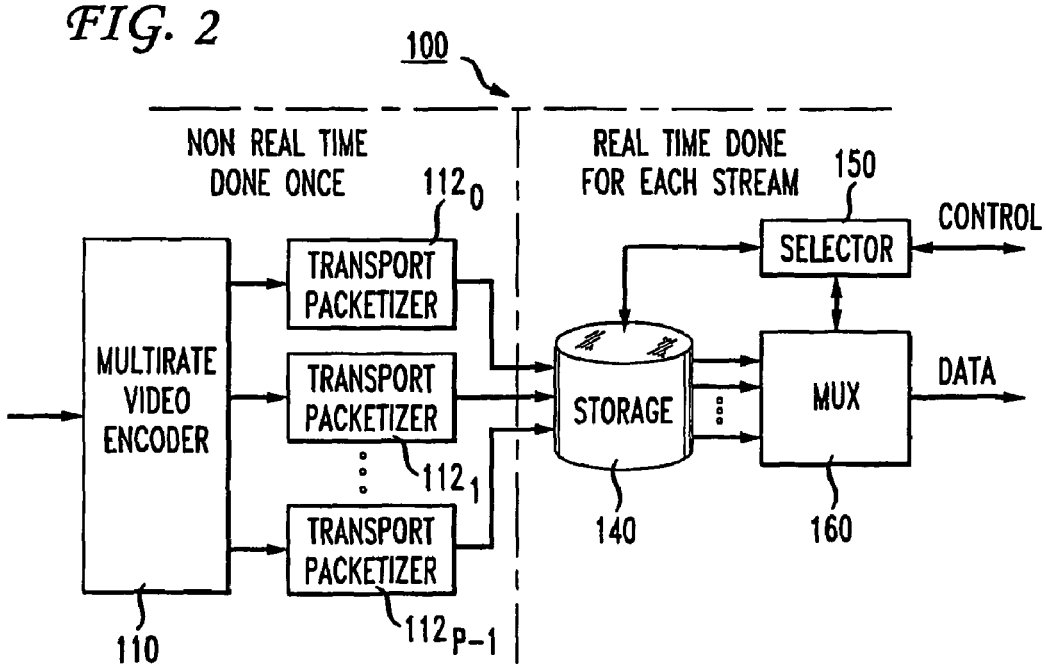
FIG. 2 depicts a block schematic of second preferred embodiment of a Video-on-Demand server architecture in accordance with the present principles.

In a first method, a multirate video encoder encodes each program at several different bit rates into several independent bit streams. Each different bit rate bit stream serves as a different representation. FIG. 2 depicts an architecture 100 for carrying out this method. As seen in FIG. 2, a multirate video encoder 110 serves to encode a corresponding program to yield a plurality of different rate representations. A separate one of transport packetizers $112_0$, $112_2$ . . . $112_{P-1}$ each packetizes a corresponding representation. The multirate encoding performed by the multirate encoder 110, and the packetization performed by the packetizers $112_0$-$112_{P-1}$ occurs once, not necessarily in real time, prior to storage in a storage device 140 similar in construction to the storage device 14 of FIG. 1.

Selection of the representations stored in storage device 140 for output in real time occurs in response to a signal received from a selector block 150. The selector block 150 identifies the stored representation for output in response to a request from the stat mux 160 for a particular representation. Upon receipt of the signal from the selector block 150, the storage device 140 supplies the selected packetized representations to the stat mux 160 for output.

In a second method, portions of the several different bit streams are combined to yield additional representations of a program. The presence of random access points at the same location in all bit streams of a program (as would naturally occur at scene changes) or the use of fixed group-of-pictures structures, permits the combination of compressed data from different bit rate streams at random access boundaries to form new representations. No need exists to store each representation independently, as long as the ability exists to generate each representation from the data that is stored. Consider the following example where T is one second, the data is coded at 30 fps, and I frames are inserted every 15 frames, yielding three different bit rate bit streams, designated as Bit stream 0, Bit stream 1, and Bit Stream 2, respectively. Each bit stream constitutes a separate representation. An additional representation can be formed which uses Bitstream 0 for the first 15 frames and Bitstream 1 for the second 15 frames, and so on.

Figure 3:
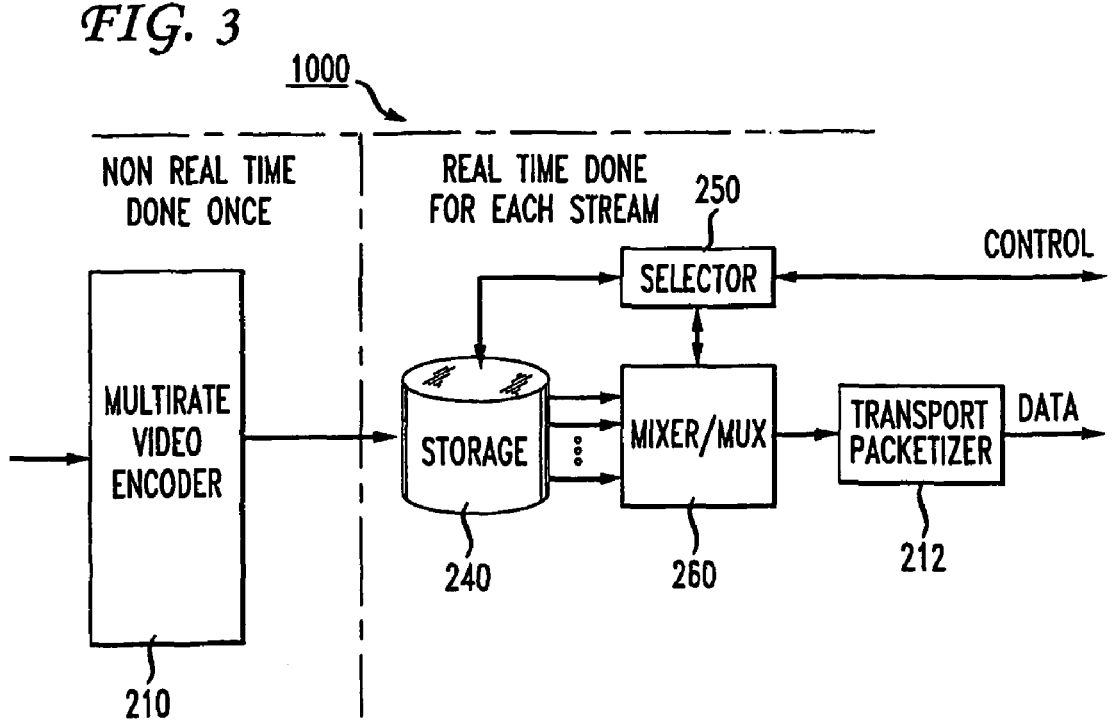
FIG. 3 depicts a block schematic of third preferred embodiment of a Video-on-Demand server architecture in accordance with the present principles.

Assuming alignment of the random access points with the transport packets, the server architecture 100 of FIG. 2 works well when the transport packetization occurs in advance. FIG. 3 depicts a VoD server architecture 200 better suited when the random access points do not necessarily align with the transport packets. Referring to FIG. 3, VoD server architecture 200 includes multirate video encoder 210 for generating a plurality of different bit rate representations for storage in a storage device 240 similar to the storage devices 14 and 140. The representations stored in the storage device 140 exist as unpacketized bit streams.

Selection of the representations stored in storage device 240 for output in real time occurs in response to a signal received from a selector block 250. The selector block 250, similar in nature to the selector block 150 of FIG. 2, identifies the stored representation for output in response to a request from a static mixer/multiplexer 260 for a particular representation. Upon receipt of the signal from the selector block 250, the storage device 240 supplies the selected packetized representations to the static mixer/multiplexer. A packetizer 212 packetizes the output stream of the static mixer/multiplexer 260 for output on the channel (not shown).

Representations also can be formed by switching between stored bit streams for non-reference pictures, such as for video codecs (not shown) that include pictures that are not used as reference pictures for predicting other pictures, such as MPEG-2 B frames or JVT non-stored pictures. Each non-reference picture can be selected from a different stored bit-stream without affecting the quality of subsequently coded pictures, as the non-stored pictures are not used for prediction. Complete elimination of a non-reference picture in a representation can also occur. Each non-reference picture could be switched individually, or groups of non-reference pictures could be switched together, allowing for many possible total bit rate representations. The multirate stream signal generators $12_0$-$12_{P-1}$ of FIG. 1 can choose to limit the number of possible representations to send to the stat mux 16 of FIG. 1 to choose those with significant differences in quality and bit rate. It is not necessary for each representation to be independently stored in storage, but a table listing the location and length of each coded frame can be stored to simplify generation of the representation when needed. It is also possible to store multiple bit rate bit streams only for the non-stored pictures and only store a single version of the reference (I and P) pictures, which can significantly reduce storage requirements.

With the VoD server architectures 100 and 200 of FIGS. 2 and 3, respectively, the stat mux 160 and the static mixer/multiplexer 260 generate a bit stream corresponding to the selected representation. If individual pictures are not transport packet aligned, the architecture 200 of FIG. accomplishes transport packetization after the generation of the bit stream for a particular representation. Otherwise, the VoD server architecture 100 of FIG. 2 FIG. 2 will work well.

In accordance with another aspect of the present principles, scalable video coding can occur by the use of a scalable video encoder (not shown) to form a base layer and one or more enhancement layers. Any type of scalability that which employs the base layer for motion compensated reference picture prediction in order to avoid drift can be used, such as frequency scalability, FGS, SNR scalability or temporal scalability. The lowest bit rate representation corresponds to the base layer. The peak bit rate of the base layer must be such that when the bit rates of all programs' base layers are summed, the channel capacity C is not exceeded for each time window T. Other higher bit rate representations will correspond to the base layer plus some portion of the enhancement layer. This approach requires that the video decoder support the type of scalability used. The VoD server architecture 100 of FIG. 2 is used upon inclusion of an entire enhancement layer in a particular representation. The VoD server architecture 200 of FIG. 3 is used if portions of an enhancement layer are used in a representation.

For systems which use encryption for contents right management, the VoD server architecture 100 of FIG. 2 does not require any decryption or encryption in real time, as encryption is added to the transport packetization process done in non-real time and entire encrypted transport packets are stored and transmitted. The VoD server architecture 200 of FIG. 3 requires that encryption be performed along with transport packetization in real-time.

VoD programs generally include both audio and video. As audio bit rates are generally significantly lower than video bit rates and are also generally at a fixed bit rate, there is less advantage to be gained by selecting from different pre-encoded audio bit streams by the stat mux 16 and 160 of FIGS. 1 and 2, and the static mixer/multiplexer 260 of FIG. 3. A user likely will find the switching of audio quality during the viewing of a single program disturbing. The total channel capacity C can be considered to be totally consumed by the video channel; assuming that a single bit rate audio stream is also sent for each program. Alternatively, the above-described methods can also be applied to audio, where multiple representations of audio programs with different bit rates and qualities can be generated.

A video player (not shown) that works with the VoD server architectures of the present principles will contain a video decoder (not shown) and some storage for buffering. For the particular program being received, the data can arrive at a non-uniform data rate, but with the requirement that the data corresponding to time unit T will arrive any time within the T time window. The video player must have the capability of buffering and delaying for T. An upper limit on the maximum bit rate that can be transmitted for a given representation of a program for a time window T can be pre-determined to limit the decoder complexity and decoder buffer size. The decoding buffer is generally a requirement of a video decoder, e.g. MPEG-2 levels sets buffer size particular requirements, and the combination of T and the bitrate may be chosen to meet it.

Fast forward and fast reverse tracks for each program can also be stored at the VoD server. They can be stored at a single bit rate, or at several different bit rates, and allowed to adapt as is done for the normal play program.

Determination of the time window T length is based on several factors. T should be as large as possible to get the most statistical multiplexing gain, but small enough to constrain the delay at the video player for start-up and switching between normal play and trick play streams. T should be small enough to meet decoder requirements.

The foregoing describes a system and method for efficiently providing video on demand while maintaining bandwidth constraints of a fixed channel.

The invention claimed is:

1. A method for transmitting a plurality of pre-coded programs having different bit rates across a fixed bandwidth channel, comprising the steps of:

generating at least two different bit rate representations of each program, said generating further comprising generating for each program a lowest bit rate representation having a peak bit rate not greater than C/P where C is the total channel capacity in time T, and P is the total number of programs;

providing control information at each of a plurality of successive time windows T for each representation of each program, the control information for each successive window indicating a bit rate and quality measure for a representation of a corresponding program; and during each time window T, selecting a representation for each program to maximize the quality of the selected representations while not exceeding a total available capacity for the channel;

wherein the selecting step further comprises the step of selecting a representation for each program which meets the constraint $$\sum_{p=0}^{P-1} r[p, n[p]] \le C$$

for all time windows wherein:
C is the total channel capacity available in time frame T;
P is the total number of programs;
p∈(0, P−1), is the index of a particular program;
N[p] is the total number of representations of program p;
n[p]∈(0, N[p]−1) is the index of a particular representation of program p; and
r[p, x] is the bit rate of representation x of program p during T.

2. The method according to claim 1 wherein the step of providing the control information further comprises the step of establishing the peak signal-to-noise ratio (PSNR) as the quality measure embodied in the control information.

3. The method according to claim 1 further comprising the step of choosing each program's representation n[p]∈(0, N[P]−1) to maximize the quality of the program p that had the minimum quality.

4. The method according to claim 3 further comprising the steps of:
  (a) sorting the quality information for with the bit rate and quality measure monotonically increasing with an index value;
  (b) storing each bit rate increment (delta) and quality value for each index value;
  (c) beginning with a lowest index value, computing total capacity S for program representations selected thus far for such index value;
  (d) selecting a program representation at a lowest quality measure;
  (e) checking whether the bit rate increment of the selected program at the lowest quality, when added to the representations selected thus far, exceeds total channel capacity, and if not
  (f) incrementing the index value; and
  (g) repeating steps (c)-(f).

5. The method according to claim 1 wherein the selecting step further comprises the step of selecting the representation for each program such to maximize a sum of individual program qualities by solving $$\max_{n[\cdot]} \sum_{p=0}^{P-1} q[p, n[p]]; \text{ subject to } \sum_{p=0}^{P-1} r[p, n[p]] \le C$$

where q[p, x] is the quality of representation x of program p during T.

6. The method according to claim 1 wherein the selecting step further comprises the step of selecting the representation for each program to maximize a product of individual program qualities by solving $$\max_{n[\cdot]} \prod_{p=0}^{P-1} q[p, n[p]]; \text{ subject to } \sum_{p=0}^{P-1} r[p, n[p]] \le C$$

where q[p x] is the quality of representation x of program p during T.

7. The method according to claim 1 further comprising the step of applying a weighted average to provide different classes of service for different viewers.

8. A system for transmitting a plurality of pre-coded programs having different bit rates across a fixed bandwidth channel, comprising the steps of:
  means for generating at least two different bit rate representations of each program;
  means providing control information at each of a plurality of successive time windows T for each representation of each program, the control information for each successive window indicating a bit rate and quality measure for a representation of a corresponding program; and
  means for selecting during each time window T a representation for each program to maximize the quality of the selected representations while not exceeding a total available capacity for the channel, said selecting means generating for each program a lowest bit rate representation having a peak bit rate not greater than C/P where C is the total channel capacity in time T and P is the total number of programs;
  wherein the selecting means selects a representation for each program which meets the constraint $$\sum_{p=0}^{P-1} r[p, n[p]] \le C$$

for all time windows where:
C is the total channel capacity available in time frame T;
P is the total number of programs;
p∈(0, P−1), is the index of a particular program;
N[P] is the total number of representations of program p;
n[p]∈(0, N[p]−1) is the index of a particular representation of program p; and
r[p, x] is the bit rate of representation x of program p during T.

9. The system according to claim 8 wherein the generating means and control information providing means collectively comprise:
  a plurality of multirate stream generators, each associated with a corresponding one of the plurality of pre-coded programs.

10. The system according to claim 8 wherein the generating means and control information providing means collectively comprise:
  a multirate video encoder for encoding at least two bit rate representations of each pre-coded program.

11. The system according to claim 8 wherein the generating means and control information providing means collectively comprise:
  a multirate video encoder for encoding at least two bit rate representations of each pre-coded program; and
  a plurality of transport packetizers, each serving to packetize the bit rate presentations for each pre-coded program.

12. The system according to claim 8 wherein the selecting means includes a static multiplexer.

13. The system according to claim 10 wherein the selecting means comprises:
  a static multiplexer; and
  a transport packetizer for packetizing the selecting representation.

14. The system according to claim 8 wherein control information providing means establishes quality measure in accordance with a peak signal-to-noise ratio (PSNR).

15. The system according to claim 8 wherein the selecting means chooses each program's representation n[p]∈ (0, N[P]−1) to maximize the quality of the program p that had the minimum quality.

16. The system according to claim 8 wherein the selecting means selects the representation for each program to maximize a sum of individual program qualities by solving:

$$\max_{n[\cdot]} \sum_{p=0}^{P-1} q[p, n[p]]; \text{ subject to } \sum_{p=0}^{P-1} r[p, n[p]] \leq C$$

where q[p, x] is the quality of representation x of program p during T.

17. The system according to claim 8 wherein the selecting means selects the representation for each program to maximize a product of individual program qualities by solving:

$$\max_{n[\cdot]} \sum_{p=0}^{P-1} q[p, n[p]]; \text{ subject to } \sum_{p=0}^{P-1} r[p, n[p]] \leq C$$

where q[p, x] is the quality of representation x of program p during T.

18. The system according to claim 8 wherein a weighted average is applied to provide different classes of service for different viewers.

* * * * *